(12) United States Patent
Zhang et al.

(10) Patent No.: US 9,497,773 B2
(45) Date of Patent: Nov. 15, 2016

(54) METHOD AND APPARATUS FOR ENHANCING RESOURCE ALLOCATION FOR UPLINK MIMO COMMUNICATION

(71) Applicant: QUALCOMM Incorporated, San Diego, CA (US)

(72) Inventors: Danlu Zhang, San Diego, CA (US); Sharad Deepak Sambhwani, San Diego, CA (US); Arjun Bharadwaj, San Diego, CA (US); Ravi Agarwal, San Diego, CA (US); Sony J. Akkarakaran, San Diego, CA (US)

(73) Assignee: QUALOCOMM Incorporated, San Diego, CA (US)

( * ) Notice: Subject to any disclaimer, the term of this patent is extended or adjusted under 35 U.S.C. 154(b) by 141 days.

(21) Appl. No.: 13/760,561

(22) Filed: Feb. 6, 2013

(65) Prior Publication Data

US 2013/0201940 A1    Aug. 8, 2013

Related U.S. Application Data

(60) Provisional application No. 61/596,682, filed on Feb. 8, 2012, provisional application No. 61/612,541, filed on Mar. 19, 2012, provisional application No. 61/646,241, filed on May 11, 2012.

(51) Int. Cl.
*H04W 72/12* (2009.01)
*H04W 52/12* (2009.01)
(Continued)

(52) U.S. Cl.
CPC ......... *H04W 72/1278* (2013.01); *H04B 7/0413* (2013.01); *H04L 1/00* (2013.01);
(Continued)

(58) Field of Classification Search
CPC . H04W 28/18; H04W 72/1289; H04W 52/12; H04W 72/1278; H04W 72/12; H04W 52/146; H04W 52/365; H04W 72/0406; H04W 52/325; H04W 72/00; H04W 28/06; H04B 7/0404; H04B 7/0413; H04L 5/0044; H04L 1/0006; H04L 1/1867; H04L 1/00; H04L 5/0064; H04L 5/001; H04L 5/0053; H04L 5/0055; H04L 5/00
See application file for complete search history.

(56) References Cited

U.S. PATENT DOCUMENTS 6,683,916 B1    1/2004    Sartori et al.
7,006,464 B1    2/2006    Gopalakrishnan et al.
(Continued)

FOREIGN PATENT DOCUMENTS

CN    101340724 A    1/2009
CN    101682462 A    3/2010
(Continued)

OTHER PUBLICATIONS

3GPP TR 25.871: "3rd Generation Partnership Project; Technical Specification Group Radio Access Network; Uplink MIMO for HSPA", Version 2.0.0, Release 11, Sep. 8, 2011, pp. 42.
(Continued)

*Primary Examiner* — Yee Lam
(74) *Attorney, Agent, or Firm* — François A. Pelaez

(57) ABSTRACT

One or more scheduling grants may be received from a Node B related to a plurality of uplink MIMO streams. A determination may be made as to a primary transport power and a primary transport block size for a primary stream. A secondary transmit power and a secondary transport block size for a secondary stream may also be determined. An enhanced relative grant channel from the Node B, as well as another E-RGC from a non-serving Node B may be received for each of the plurality of uplink MIMO streams.

23 Claims, 9 Drawing Sheets

(51) Int. Cl.

| | |
|---|---|
| H04W 52/14 | (2009.01) |
| H04W 28/18 | (2009.01) |
| H04L 5/00 | (2006.01) |
| H04L 1/00 | (2006.01) |
| H04L 1/18 | (2006.01) |
| H04B 7/04 | (2006.01) |

(52) U.S. Cl.
CPC ............ *H04L 1/0006* (2013.01); *H04L 5/0044* (2013.01); *H04L 5/0064* (2013.01); *H04W 52/12* (2013.01); *H04W 52/146* (2013.01); *H04W 72/12* (2013.01); *H04B 7/0404* (2013.01); *H04L 1/1867* (2013.01); *H04W 28/18* (2013.01); *H04W 72/1289* (2013.01)

(56) References Cited

U.S. PATENT DOCUMENTS

| | | | |
|---|---|---|---|
| 7,447,516 | B2 | 11/2008 | Heo et al. |
| 7,454,181 | B2 | 11/2008 | Banister et al. |
| 7,715,430 | B2 | 5/2010 | Ranta-Aho et al. |
| 7,924,949 | B2 | 4/2011 | Larsson |
| 7,990,905 | B2 | 8/2011 | Lappetelainen et al. |
| 8,208,447 | B2 | 6/2012 | Qian et al. |
| 8,355,424 | B2 | 1/2013 | Xi et al. |
| 8,416,873 | B2 | 4/2013 | Lincoln et al. |
| 8,521,209 | B2 | 8/2013 | Kim et al. |
| 8,665,990 | B2 | 3/2014 | Xi et al. |
| 8,687,541 | B2 | 4/2014 | Loehr et al. |
| 8,830,904 | B2 | 9/2014 | Kim et al. |
| 2005/0047344 | A1 | 3/2005 | Seol |
| 2006/0105798 | A1 | 5/2006 | Ghosh et al. |
| 2006/0255989 | A1 | 11/2006 | Kim et al. |
| 2006/0280145 | A1* | 12/2006 | Revel et al. ............... 370/331 |
| 2007/0041342 | A1* | 2/2007 | Usuda et al. ............... 370/329 |
| 2007/0066339 | A1* | 3/2007 | Usuda et al. ............... 455/522 |
| 2007/0173275 | A1 | 7/2007 | Das et al. |
| 2007/0242773 | A1 | 10/2007 | Li et al. |
| 2007/0268869 | A1 | 11/2007 | Lundby et al. |
| 2008/0159234 | A1 | 7/2008 | Prakash et al. |
| 2008/0186944 | A1 | 8/2008 | Suzuki et al. |
| 2008/0247375 | A1 | 10/2008 | Muharemovic et al. |
| 2008/0254819 | A1* | 10/2008 | Niwano et al. ............. 455/522 |
| 2008/0273517 | A1 | 11/2008 | Nishio et al. |
| 2008/0298224 | A1 | 12/2008 | Pi et al. |
| 2008/0303699 | A1 | 12/2008 | Zhang et al. |
| 2009/0034487 | A1 | 2/2009 | Lohr et al. |
| 2009/0154403 | A1 | 6/2009 | Niwano |
| 2009/0213765 | A1 | 8/2009 | Rinne et al. |
| 2009/0245209 | A1 | 10/2009 | Cho et al. |
| 2009/0323842 | A1 | 12/2009 | Zhang et al. |
| 2009/0327828 | A1 | 12/2009 | Ojala et al. |
| 2010/0046481 | A1 | 2/2010 | Chen et al. |
| 2010/0067435 | A1 | 3/2010 | Balachandran et al. |
| 2010/0067459 | A1 | 3/2010 | Goransson et al. |
| 2010/0074229 | A1 | 3/2010 | Seki |
| 2010/0074316 | A1 | 3/2010 | Kim et al. |
| 2010/0087202 | A1 | 4/2010 | Ventola et al. |
| 2010/0098005 | A1 | 4/2010 | Lee et al. |
| 2010/0103901 | A1 | 4/2010 | Miki et al. |
| 2010/0111023 | A1 | 5/2010 | Pelletier et al. |
| 2010/0111226 | A1 | 5/2010 | Ko et al. |
| 2010/0113004 | A1* | 5/2010 | Cave et al. ............... 455/422.1 |
| 2010/0130219 | A1 | 5/2010 | Cave et al. |
| 2010/0150000 | A1 | 6/2010 | Sakata |
| 2010/0157895 | A1 | 6/2010 | Pani et al. |
| 2010/0158151 | A1 | 6/2010 | Krauss et al. |
| 2010/0189075 | A1 | 7/2010 | Iwamura et al. |
| 2010/0202392 | A1 | 8/2010 | Zhang et al. |
| 2010/0218065 | A1 | 8/2010 | Balachandran et al. |
| 2010/0233962 | A1* | 9/2010 | Johansson ............ H04W 52/343 455/63.1 |
| 2010/0238825 | A1 | 9/2010 | Zhang et al. |
| 2010/0238904 | A1 | 9/2010 | Zhang et al. |
| 2010/0246516 | A1 | 9/2010 | Pelletier et al. |
| 2010/0246520 | A1 | 9/2010 | Andersson |
| 2010/0246705 | A1 | 9/2010 | Shin et al. |
| 2010/0260284 | A1 | 10/2010 | Yoshii et al. |
| 2010/0271939 | A1 | 10/2010 | Gholmieh et al. |
| 2010/0273515 | A1 | 10/2010 | Fabien et al. |
| 2010/0285830 | A1 | 11/2010 | Englund et al. |
| 2010/0290389 | A1 | 11/2010 | Hou et al. |
| 2010/0296422 | A1 | 11/2010 | Ericson et al. |
| 2010/0298021 | A1 | 11/2010 | Bergman et al. |
| 2010/0311433 | A1 | 12/2010 | Lindskog et al. |
| 2010/0316156 | A1 | 12/2010 | Higuchi et al. |
| 2010/0329136 | A1* | 12/2010 | Murata et al. ................. 370/252 |
| 2011/0013615 | A1 | 1/2011 | Lee et al. |
| 2011/0019625 | A1 | 1/2011 | Zhang et al. |
| 2011/0021239 | A1 | 1/2011 | Wakabayashi et al. |
| 2011/0026419 | A1 | 2/2011 | Kim et al. |
| 2011/0028141 | A1 | 2/2011 | Yang et al. |
| 2011/0032885 | A1 | 2/2011 | Wang et al. |
| 2011/0053631 | A1 | 3/2011 | Bottomley et al. |
| 2011/0064159 | A1 | 3/2011 | Ko et al. |
| 2011/0075651 | A1 | 3/2011 | Jia et al. |
| 2011/0080972 | A1 | 4/2011 | Xi et al. |
| 2011/0081935 | A1 | 4/2011 | Yeon et al. |
| 2011/0081936 | A1 | 4/2011 | Haim et al. |
| 2011/0085516 | A1 | 4/2011 | Pajukoski et al. |
| 2011/0128926 | A1 | 6/2011 | Nama et al. |
| 2011/0150004 | A1 | 6/2011 | Denteneer et al. |
| 2011/0150059 | A1 | 6/2011 | Cedergren et al. |
| 2011/0263281 | A1 | 10/2011 | Cai et al. |
| 2011/0300854 | A1 | 12/2011 | Shan et al. |
| 2011/0305262 | A1 | 12/2011 | Medles |
| 2012/0008490 | A1 | 1/2012 | Zhu |
| 2012/0044798 | A1 | 2/2012 | Yan et al. |
| 2012/0044898 | A1 | 2/2012 | Ishii |
| 2012/0082192 | A1 | 4/2012 | Pelletier et al. |
| 2012/0083264 | A1* | 4/2012 | Ramasamy et al. ............ 455/425 |
| 2012/0106504 | A1 | 5/2012 | Klatt et al. |
| 2012/0127869 | A1 | 5/2012 | Yin et al. |
| 2012/0147830 | A1 | 6/2012 | Lohr et al. |
| 2012/0177011 | A1* | 7/2012 | Xi et al. .................. 370/335 |
| 2012/0177089 | A1* | 7/2012 | Pelletier et al. ............. 375/219 |
| 2012/0220324 | A1 | 8/2012 | Sambhwani et al. |
| 2012/0224552 | A1 | 9/2012 | Feuersanger et al. |
| 2012/0236799 | A1 | 9/2012 | Dai et al. |
| 2012/0275403 | A1 | 11/2012 | Zhang et al. |
| 2012/0281642 | A1 | 11/2012 | Sambhwani et al. |
| 2012/0287798 | A1 | 11/2012 | Sambhwani et al. |
| 2012/0287867 | A1 | 11/2012 | Sambhwani et al. |
| 2012/0287868 | A1 | 11/2012 | Sambhwani et al. |
| 2012/0287965 | A1 | 11/2012 | Sambhwani et al. |
| 2012/0294254 | A1 | 11/2012 | Behravan et al. |
| 2012/0314640 | A1 | 12/2012 | Kim et al. |
| 2013/0229906 | A1 | 9/2013 | Akkarakaran et al. |
| 2013/0279459 | A1 | 10/2013 | Lee et al. |
| 2014/0056236 | A1 | 2/2014 | Bergman et al. |
| 2015/0055606 | A1 | 2/2015 | Yang et al. |

FOREIGN PATENT DOCUMENTS

| | | |
|---|---|---|
| CN | 101874363 A | 10/2010 |
| EP | 1684454 A1 | 7/2006 |
| EP | 1788742 A1 | 5/2007 |
| EP | 1788748 A1 | 5/2007 |
| EP | 1863248 A1 | 12/2007 |
| EP | 2141935 A1 | 1/2010 |
| EP | 2306659 A2 | 4/2011 |
| EP | 2437565 A1 | 4/2012 |
| JP | 2003086233 A | 3/2003 |
| JP | 2003348011 A | 12/2003 |
| JP | 2006295834 A | 10/2006 |
| JP | 2007505589 A | 3/2007 |
| JP | 2008011522 A | 1/2008 |
| JP | 2009525699 A | 7/2009 |
| JP | 2010523042 A | 7/2010 |
| JP | 2010531615 A | 9/2010 |
| JP | 2011507330 A | 3/2011 |
| JP | 2011517203 A | 5/2011 |
| JP | 2011530952 A | 12/2011 |
| JP | 2012507961 A | 3/2012 |

(56) References Cited

FOREIGN PATENT DOCUMENTS

| | | |
|---|---|---|
| JP | 2013511168 A | 3/2013 |
| JP | 2013526109 A | 6/2013 |
| JP | 2013530560 A | 7/2013 |
| KR | 20080011822 A | 2/2008 |
| KR | 20090063085 A | 6/2009 |
| RU | 2005129080 A | 1/2006 |
| WO | 02087108 A1 | 10/2002 |
| WO | 2005050885 A1 | 6/2005 |
| WO | 2005088864 | 9/2005 |
| WO | 2006030478 A1 | 3/2006 |
| WO | 2006116704 A2 | 11/2006 |
| WO | 2007024853 A2 | 3/2007 |
| WO | 2007092258 A1 | 8/2007 |
| WO | 2008118081 A2 | 10/2008 |
| WO | 2008123148 A1 | 10/2008 |
| WO | 2008131902 A1 | 11/2008 |
| WO | 2009002251 A2 | 12/2008 |
| WO | 2009068078 A1 | 6/2009 |
| WO | 2009149561 A1 | 12/2009 |
| WO | 2010011083 A2 | 1/2010 |
| WO | 2010019091 A1 | 2/2010 |
| WO | 2010039561 A2 | 4/2010 |
| WO | 2010051513 A2 | 5/2010 |
| WO | 2010051520 A1 | 5/2010 |
| WO | 2010068487 A1 | 6/2010 |
| WO | 2010091417 A1 | 8/2010 |
| WO | 2010091423 A2 | 8/2010 |
| WO | 2010091425 A2 | 8/2010 |
| WO | 2010107699 A2 | 9/2010 |
| WO | 2010117981 A2 | 10/2010 |
| WO | 2010124470 A1 | 11/2010 |
| WO | 2011000320 A1 | 1/2011 |
| WO | 2011041492 A2 | 4/2011 |
| WO | 2011041719 A2 | 4/2011 |
| WO | 2011122835 A2 | 10/2011 |
| WO | 2011127358 A1 | 10/2011 |
| WO | 2011136528 A2 | 11/2011 |
| WO | 2012064781 A1 | 5/2012 |
| WO | 2012064784 A2 | 5/2012 |
| WO | 2012087222 A2 | 6/2012 |

OTHER PUBLICATIONS

CATT: "Discussion on outer loop power control of E-AGCH in MC-HSUPA", 3GPP Draft; R1-104363, 3rd Generation Partnershi P Project (3GPP) , Mobi Le Competence Centre ; 650, Route Des Lucioles ; F-06921 Sophia-Anti Polis Cedex; France, vol. RAN WG1, no. Madrid, Spain; Aug. 23, 2010, Aug. 17, 2010, XP050449717, [retrieved on Aug. 17, 2010] p. 1, lines 1-10 section 2.1.

Ericsson et al: "DC-HSUPA—Power scaling at UE power limitation" , 3GPP Draft; R1-092763 DC-HSUPA Power Scaling at UE Power Limitation, 3rd Generation Partnership Project (3GPP), Mobile Competence Centre ; 650, Route Des Lucioles ; F-06921 Sophia-Antipolis Cedex; France, no. Los Angeles, USA; Jun. 24, 2009, XP050351219, [retrieved on Jun. 24, 2009] the whole document.

Ericsson, ST-Ericsson, "Uplink pilot design for UL CLTD and UL MIMO", 3GPP TSG RAN WG1 Meeting #63bis, R1-110484, Dublin, Ireland, Jan. 17-21, 2011.

Huawei, HiSilicon, "Simulation assumptions for UL MIMO", 3GPP TSG-RAN WG1 Meeting #64, R1-100998, Taipei, Feb. 21-25, 2011, pp. 1-3.

Interdigital: "Dual-Cell HSUPA Considerations", 3GPP Draft, R2-092449, 3rd Generation Partnership Project (3GPP), Mobile Competence Centre, 650, Route Des Lucioles, F-06921 Sophia-Antipolis Cedex, France, no. Seoul, Korea, Mar. 17, 2009, XP050340155, [retrieved on Mar. 17, 2009].

NEC Group: "PDCCH Structure for LTE-Advanced System", 3GPP Draft; R1-091692 PDCCH Structure for LTE-Advanced System, 3rd Generation Partnership Project (3GPP), Mobile Competence Centre; 650, Route Des Lucioles; F-06921 Sophia-Antipolis Cedex; France, no. San Francisco, USA; Apr. 28, 2009, XP050339231, [retrieved on Apr. 28, 2009].

Nokia Siemens Networks et al., "Options for uplink closed loop TX diversity & beamforming", 3GPP Draft; R1-104914, 3rd Generation Partnership Project (3GPP), Mobile Competence Centre ; 650, Route Des Lucioles ; F-06921 Sophia-Antipolis Cedex ; France, vol. RAN WG1, no. Madrid, Spain; Aug. 23, 2010, Aug. 17, 2010, XP050450060, [retrieved on Aug. 17, 2010].

QUALCOMM Europe: "E-TFC Selection in DC-HSUPA—The Last Open Issues", 3GPP Draft; R2-096838 ETFC Selection DCHSUPA Last Open Issues, 3rd Generation Partnership Project (3GPP), Mobile Competence Centre ; 650, Route Des Lucioles ; F-06921 Sophia-Antipolis Cedex ; France, no. Jeju; Nov. 9, 2009, Nov. 1, 2009, XP050391273.

QUALCOMM Europe: "Remaining Issues in E-TFC Selection in DC-HSUPA", 3GPP Draft, R2-095957, 3rd Generation Partnership Project (3GPP), Mobile Competence Centre, 650, Route Des Lucioles, F-06921 Sophia-Antipolis Cedex, France, no. Miyazaki, Oct. 12, 2009, Oct. 16, 2009, XP050390391, [retrieved on Oct. 6, 2009].

QUALCOMM Incorporated, "Introduction to UL MIMO in HSPA", 3GPP TSG RAN WG1 Meeting #63, R1-106336, Jacksonville, USA, Nov. 15-19, 2010.

QUALCOMM Incorporated, "Uplink Power Control Design for UL MIMO", 3GPP TSG RAN WG1 Meeting #63bis, R1-110133, Dublin, Ireland, Jan. 17-21, 2011, pp. 1-4.

Tiirola E et al., "Performance of a UMTS uplink MIMO scheme", Vehicular Technology Conference, 2003. VTC 2003—FALL. 2003 IEEE 58th Orlando, FL, USA Oct. 6-9, 2003; [IEEE Vehicular-Technolgy Conference], Piscataway, NJ, USA,IEEE, US, Oct. 6, 2003, pp. 657-661 vol. 1, XP010700961, DOI: 10.1109/VETECF. 2003.1285099 ISBN: 978-0-7803-7954-1.

3GPP: "3rd Generation Partnership Project; Technical Specification Group Radio Access Network; Medium Access Control (MAC) protocol specification (Release 11)", 3GPP Draft; 25321-B00, 3rd Generation Partnership Project (3GPP), Mobile Competence Centre; 650, Route Des Lucioles; F-06921 Sophia-Antipolis Cedex; France, Dec. 20, 2011, XP050563752, [retrieved on Dec. 20, 2011] p. 151-pp. 152,165.

Co-pending U.S. Appl. No. 13/760,252, filed Feb. 6, 2013.
Co-pending U.S. Appl. No. 13/760,275, filed Feb. 6, 2013.
Co-pending U.S. Appl. No. 13/843,451, filed Mar. 15, 2013.

Ericsson et al: "Initial considerations on the design for UL MIMO for HSUPA", 3GPP Draft; R1-110496 Initial Considerations on the Design for Uplink MIMO, 3rd Generation Partnership Project (3GPP), Mobile Competence Centre ; 650, Route Des Lucioles ; F-06921 Sophia-Antipolis Cedex ; France, vol. RAN WG1, no./Dublin, Ireland; Jan. 17, 2011, Jan. 11, 2011, XP050490303, [retrieved on Jan. 11, 2011] pp. 10,11,14.

Ericsson et al: "Quality Control of the Secondary Stream for Uplink MIMO with 64QAM", 3GPP Draft; R1-120344, 3rd Generation Partnership Project (3GPP), Mobile Competence Centr ; 650, Route Des Lucioles; F-06921 Sophia-Antipolis Cedex; France, vol. RAN WG1, no. Dresden, Germany; Feb. 6, 2012-Feb. 10, 2012, Feb. 1, 2012, XP050563198, [retrieved on Feb. 1, 2012] pp. 1-3.

Nokia Siemens Networks et al: "Uplink MIMO link level evaluation", 3GPP Draft; R1112632, 3rd Generation Partnership Project (3GPP), Mobile Competence Centre; 650, Route Des Lucioles; F-06921 Sophia-Antipolis Cedex; France, vol. RAN WG1, no. Athens, Greece; Aug. 22, 2011, Aug. 19, 2011, XP050537848, [retrieved on Aug. 19, 2011] pp. 1,5,19.

"3rd Generation Partnership Project; Technical Specification Group Radio Access Network; Uplink Multiple Input Multiple Output (MIMO) for High Speed Packet Access (HSPA) (Release 11)", 3GPP Standard; 3GPP TR 25.871, 3rd Generation Partnership Project (3GPP), Mobile Competence Centre; 650, Route Des Lucioles; F-06921 Sophia-Antipolis Cedex; France, vol. RAN WG1, No. V11. 0.0, Sep. 27, 2011, pp. 1-42, XP050554073.

Ericsson et al., "E-TFC selection for DC-HSUPA", 3GPP Draft; R2-100190, 3rd Generation Partnership Project (3GPP), Mobile Competence Centre ; 650, Route Des Lucioles; F-06921 Sophia-Antipolis Cedex; France, vol. RAN WG2, no. Valencia, Spain; Jan. 18, 2010, Jan. 10, 2010, XP050420746.

LG Electronics Inc: "Uplink Signalling With Happy Bit", 3GPP Draft; R2-051422 Uplink Signalling With Happy Bit, 3rd Generation

(56) References Cited

OTHER PUBLICATIONS

Partnership Project (3GPP), Mobile Competence Centre; 650, Route Des Lucioles; F-06921 Sophia-Antipolis Cedex; France, vol. RAN WG2, no. Athens; May 9, 2005-May 13, 2005, May 5, 2005, XP050602543.

3GPP TS 25.214, 3rd Generation Partnership Project; Technical Specification Group Radio Access Network; Physical layer prodedures, FDD, V7.16.0, Release 7, Sep. 2010, pp. 1-88.

3GPP TS 36.213, "LTE; Evolved Universal Terrestrial Radio Access (E-UTRA); Physical layer procedures (3GPP TS 36.213 version 9.3.0 Release 9)", Technical Specification, European Telecommunications Standards Institute (ETSI), Version 9.3.0, 650, Route Des Lucioles; F-06921 Sophia-Antipolis; France, Oct. 1, 2010, XP014061703, abstract.

Ericsson et al: "Closed loop transmit diversity for HSUPA", 3GPP Draft; R1-105475 Closed Loop Transmit Divesity for HSUPA, 3rd Generation Partnership Project (3GPP), Mobile Competence Centre; 650, Route Des Lucioles; F-06921 Sophia-Anti Polis Cedex; France, vol. RAN WG1, No. X i 'an; Oct. 11, 2010, Oct. 6, 2010, XP050450743, [ retrieved on Oct. 6, 2010].

Hayashi T., "Absolutely easy-to-understand", Super Introduction of Mobile Broad Band, the first printing, Nikkei Business Publications, 1st edition,Sep. 19, 2009, pp. 56.

High Speed Uplink Packet Access (HSUPA) White Paper, 3GPP Release 6, Rohde&Schwarz Products:FSP,FSQ,FSU,FS-K72,FS-K73,FS-K74, SMU200A,SMATE200A,SMJ100A,CRTU-M,CRTU-WA01.

Inoue M., et al., "A Study of MIMO-OFDM with Error Detection Code System", IEICE Technical Report CAS2003-124, Mar. 8, 2004, vol. 103, No. 720, pp. 105-110.

International Search Report and Written Opinion—PCT/US2013/040567—ISA/EPO—Aug. 14, 2013.

LG Electronics: "Enhancements of HARQ scheme for HSDPA", 3GPP R1-01-0620, May 25, 2001, pp. 1-2.

QUALCOM Incorporated: "Remaining details for UL MIMO scheme for retransmissions triggered by PHICH", 3GPP R1-106370, Nov. 19, 2010, pp. 1-5.

QUALCOMM Incorporated, "On the benefits of Uplink Closed Loop Transmit Diversity", 3GPP R1-104737, Aug. 27, 2010.

QUALCOMM Incorporated, "Physical Channels for UL MIMO operation," 3GPP R1-110131, Jan. 21, 2011.

SIMENS: "Performance of the HARQ Retransmission Power Offset Scheme for 10ms TTI", 3GPP R1-040446, May 14, 2004, pp. 1-6.

ZTE: "Remaining issues for UL SU-MIMO in PHICH-triggered retransmission", 3GPP R1-105964, Nov. 19, 2010, pp. 1-3.

* cited by examiner

METHOD AND APPARATUS FOR ENHANCING RESOURCE ALLOCATION FOR UPLINK MIMO COMMUNICATION

CLAIM OF PRIORITY UNDER 35 U.S.C. §119

The present application for patent claims priority to the following provisional patent applications:

U.S. Provisional Application No. 61/596,682 entitled "Method and Apparatus for Managing Uplink Multiple-Input Multiple Media Access Control Layer" filed Feb. 8, 2012;-Output at a U.S. Provisional Application No. 61/612,541 entitled "Signaling Grants, E-TFC Selection and Power Scaling for UL MIMO" filed Mar. 19, 2012; and U.S. Provisional Application No. 61/646,241 entitled "E-TFC Selection and Serving Grant Interpretation for UL Multiple-Input Multiple-Output (MIMO)" filed May 11, 2012, each of which is assigned to the assignee hereof and hereby expressly incorporated by reference herein.

REFERENCE TO CO-PENDING APPLICATIONS FOR PATENT

The present application for patent is related to the following co-pending U.S. patent applications:

"Method and Apparatus for Scheduling Resources for Uplink MIMO Communication" application Ser. No. 13/760,252, filed concurrently herewith, assigned to the assignee hereof, and expressly incorporated by reference herein; and "Method and Apparatus for E-TFC Selection for Uplink MIMO Communication" application Ser. No. 13/760,275, filed concurrently herewith, assigned to the assignee hereof, and expressly incorporated by reference herein.

BACKGROUND

1. Field

Aspects of the present disclosure relate generally to wireless communication systems, and more particularly to uplink multiple-input multiple-output (MIMO).

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Generally, a wireless multiple-access communication system can simultaneously support communication for multiple user equipment devices (UE). Each UE communicates with one or more base stations, such as a Node B via transmissions on the forward and reverse links. The forward link (or downlink) refers to the communication link from the Node Bs to the UEs, and the reverse link (or uplink) refers to the communication link from the UEs to the Node Bs. This communication link may be established via a single-in-single-out, multiple-in-single-out or a multiple-in-multiple-out (MIMO) system. Thus, for example, the system can utilize downlink and/or uplink MIMO to facilitate improved throughput, transmission reliability, communication range, and/or the like.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various considerations regarding uplink multiple-input multiple-output (MIMO) considerations are presented herein. For example, mechanisms for determining whether to provide multiple uplink streams to a user equipment (UE), enhanced transport format combination (E-TFC) for the multiple streams, power scaling and transport block size (TBS) selection for the multiple streams, outer-loop power control, and other considerations are addressed herein.

In one aspect, a method for communicating using multiple-input multiple-output (MIMO) in a wireless network is described herein. Te method comprises receiving one or more scheduling grants from a Node B relating to a plurality of uplink streams in MIMO; determining a primary transmit power and a primary transport block size (TBS) for a primary stream of the plurality of uplink streams; determining a secondary transmit power and a secondary TBS for a secondary stream of the plurality of uplink streams; and receiving an enhanced relative grant channel (E-RGCH) from the Node B, as well as another E-RGCH from a non-serving Node B, for each of the plurality of uplink streams.

In another aspect, a method for scheduling multiple streams for a user equipment (UE) is described herein, The method comprises determining a scheduling grant for a UE comprising multiple streams based in part on determining whether the scheduling grant increases throughput at the UE or at a cell; and transmitting the scheduling grant to the UE Other aspects include one or more of: a computer program product having a computer-readable medium including at least one instruction operable to cause a computer to perform the above-described methods; an apparatus including one or more means for performing the above-described methods; and an apparatus having a memory in communication with a processor that is configured to perform the above-described methods.

These and other aspects of the disclosure will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Described herein are various aspects related to improving uplink multiple-input multiple-output (MIMO) communications in a wireless network. Proposed are mechanisms for determining whether to allocate multiple uplink streams to a user equipment (UE), determining an enhance transport format combination (E-TFC) for the streams, power scaling and transport block size (TBS) selection for the multiple streams, outer-loop power control, and similar considerations. For example, a scheduling algorithm can consider throughput at a UE as well as at the serving cell or related Node B in determining whether to assign multiple uplink streams to the UE. Rise-over-thermal (RoT) can also be controlled for the multiple uplink carriers. As used herein, RoT refers to a ratio between the total interference received on a base station (Node B) and the thermal range of the base station.

Moreover, in an example, a Node B can assign E-TFCs for each stream based on a set of rules, which can be related to considerations of both streams in some examples. Also, the Node B can utilize newly defined E-TFCs for assigning to the streams that account for intricacies of multiple stream operation. The E-TFCs can have different state definitions, hybrid automatic repeat/request (HARQ) assignment considerations, power scaling and TBS selection computations, etc. Additionally, considerations regarding outer-loop power control based on assignment of multiple streamss are presented herein. The possible scheduling assignments, E-TFC associations, power control factors, etc. can improve uplink MIMO performance in wireless networks. The described considerations can be implemented at the media access control (MAC) layer at a UE, Node B, etc., in one example.

Figure 1:
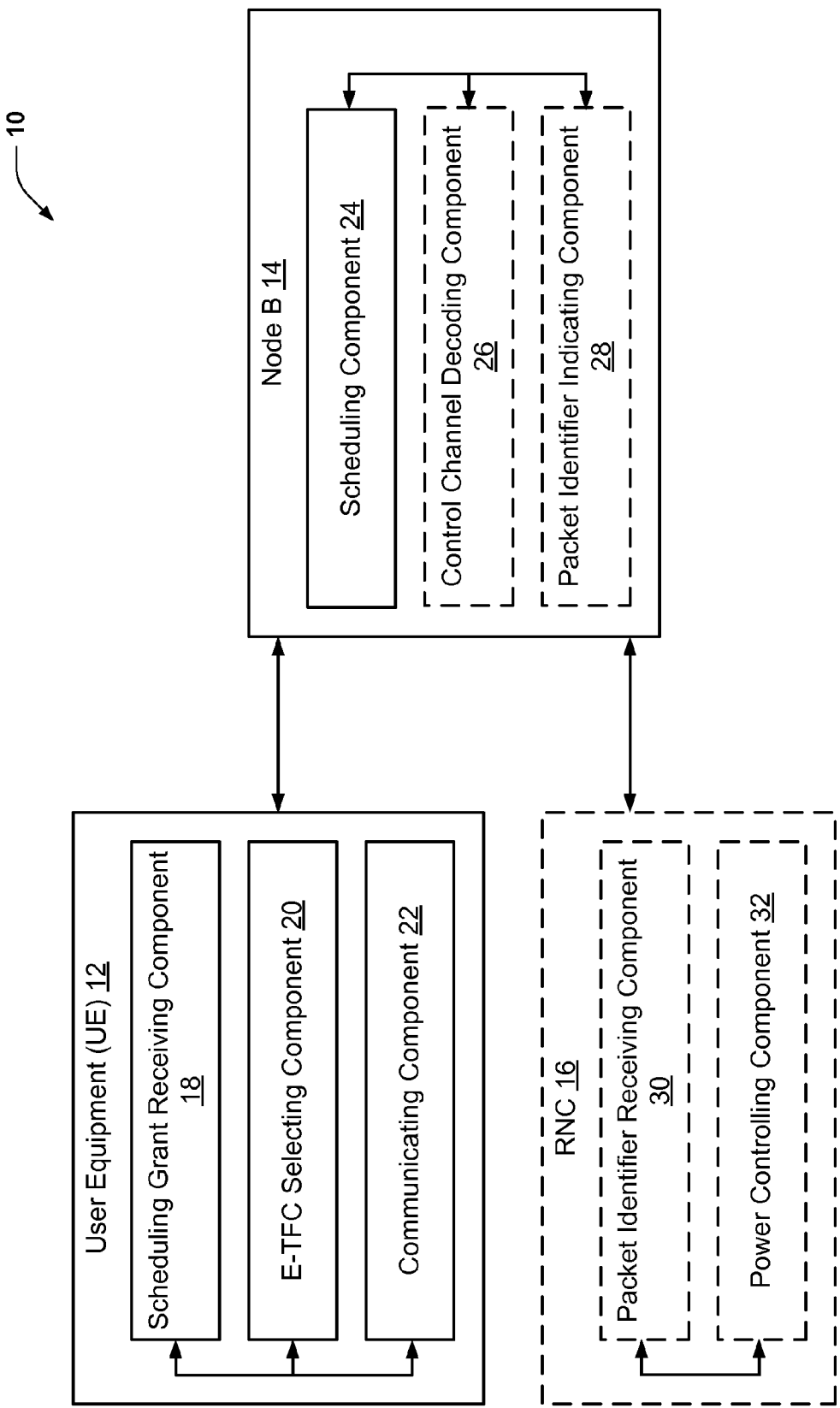
FIG. 1 is a schematic block diagram of one aspect of a system for scheduling multiple uplink streams to a user equipment.

Referring to FIG. 1, in one aspect, a wireless communication system 10 includes a user equipment (UE) 12 for communicating with a Node B 14 to receive wireless network access. System 10 also optionally includes a RNC 16 for facilitating Node B access to the wireless network. For example, the Node B 14 can be substantially any Node B, such as a macrocell, picocell, or femtocell Node B, a mobile Node B, a relay, a UE that communicates in a peer-to-peer or ad-hoc mode with UE 12, and/or substantially any component that schedules UEs for communicating in a wireless network. Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device.

UE 12 includes a scheduling grant receiving component 18 for obtaining one or more scheduling grants from a Node B for communicating in a wireless network, an E-TFC selecting component 20 for associating uplink streams in the scheduling grants or related flows to an E-TFC, and a communicating component 22 for transmitting over the uplink streams to the Node B.

Node B 14 includes a scheduling component 24 for communicating one or more scheduling grants to the UE 12 for one or multiple streams. Node B 14 optionally includes a control channel decoding component 26 for obtaining feedback regarding the uplink streams, and/or a packet identifier indicating component 28 for communicating an identifier related to a flow from which a packet is received to an RNC to facilitate power control.

RNC 16 optionally includes a packet identifier receiving component 30 for obtaining packet identifiers from a Node B 14 indicating a stream related to the packet, and/or a power controlling component 32 for implementing outer-loop power control for a corresponding UE.

According to an example, UE 12 can request network access from Node B 14 or can otherwise communicate therewith. Scheduling component 24 can determine a scheduling grant for the UE 12 (e.g., upon initializing communications therewith or based on one or more detected events, such as a request from the UE 12 for additional resources, etc). This can include determining whether to grant multiple uplink streams to the UE 12. The scheduling component 24 can consider at least one of maximizing throughput of the UE 12 or maximizing throughput of Node B 14 or a related cell in determining whether to assign multiple uplink streams to UE 12. For example, where one user is scheduled by Node B 14 in each TTI, the scheduling component 24 can assign multiple uplink streams to UE 12 based on determining that the UE throughput would increase by the additional uplink stream(s) without significantly impairing throughput at Node B 14.

Moreover, for example, scheduling component 24 can ensure combined data rates over the multiple streams are proportionally fair among multiple UEs. Also, scheduling component 24 can schedule the additional streams to be at least at a minimum throughput. Moreover, scheduling component 24 can schedule the additional streams based on a relationship to the primary stream (e.g., at a lower throughput than the primary stream). In some aspects, scheduling component 24 may assign a primary scheduling grant, which may be used to determine a transport block size for a primary stream, in addition to a secondary scheduling grant, which may be used to determine a transport block size for a secondary stream. As used herein, primary stream refers to a transmission stream used to carry a primary data channel E-DPDCH, and secondary stream refers to a transmission stream used to carry a secondary data channel S-E-DPDCH. In any case, scheduling grant receiving component 18 can obtain the grant for one or more uplink streams from Node B 14 and communicating component 22 can accordingly communicate with Node B 14 over the one or more uplink streams. The scheduling component 24 can assign the multiple streams to different users based on their channel conditions.

In addition, scheduling component 24 can control RoT at Node B 14 to ensure it does not exceed an RoT threshold. In this example, scheduling component 24 can control an effective RoT caused by a given stream, which corresponds to the RoT over the given stream after interference suppression (e.g., by a linear minimum mean square error (LMMSE) receiver or other interference cancellation scheme). For example, if the RoT is over a threshold, scheduling component 24 can reduce a throughput or grant size an offending stream, which can occur based on the rules of scheduling above (e.g., additional streams cannot have a throughput below the minimum, additional streams may have lower throughput than the primary stream, etc.).

Spatial coloring, or directionality, in the interference caused by multiple stream assignment can bring new issues to inter-cell interference coordination. This issue may exist in legacy uplink systems where each UE only transmits one stream. As long as the total interference from a cell comes from multiple UEs, directionality in the total interference tends to be averaged out. However, directional interference may create more severe problems in uplink MIMO, where a single UE may dominate the total interference from a cell. Accordingly, in some aspects, non-serving Node Bs (not shown) of UE 12 are permitted to communicate enhanced relative grant channel (E-RGCH) grants to UE 12 to cause decrease in transmit power to protect the non-serving Node Bs from interference by UE 12. Thus, for example, scheduling component 24 can infer a non-serving E-RGCH based on UE 12 behavior: where the UE selects smaller traffic-to-pilot (T2P) ratios and/or transport block sizes (TBS) for one or more assigned uplink streams, scheduling component 24 can assume UE 12 is limited by inter-cell interference caused to a non-serving Node B. As used herein, a T2P ratio refers to an offset of the data traffic channel to the pilot channel. Thus, in one example, scheduling component 24 can decrease throughput for UE 12 and grant the additional throughput up to a remaining RoT margin to other UEs.

Additionally, for example, E-TFC selecting component 20 can assign an E-TFC to each stream received in the scheduling grant(s) from Node B 14 by scheduling grant receiving component 18, or flows related thereto. This can occur at the MAC layer, in one example. The E-TFC can define constraints for communicating over the primary and/or additional uplink streams assigned to UE 12 based on available transmission resources, for example. UE 12 can support sets of states for the E-TFCs selectable by the E-TFC selecting component 20 for given streams.

For example, the sets of states can include a first set related to the primary stream of two streams, a second set of states related to the secondary stream of two streams, a third set for one stream only, etc. For example, given n streams, UE 12 can maintain n+(n−1)+(n−2)+ . . . +(n−(n−1)) sets of states—one for each possible stream in a given stream configuration. Each state in a given set of states can indicate whether a corresponding payload is supported or blocked over the corresponding stream configuration, which can be referred to herein as E-TFC restriction. The states can be modified by the UE 12 based on resources available for communicating with Node B 14 (e.g., in a previous transmission period), and UE 12 can obey the states when communicating with Node B 14. Thus, for example, E-TFC selecting component 20 can select an E-TFC for the streams related to the scheduling grant(s) received by scheduling grant receiving component 18, and communicating component 22 can determine whether to transmit data for one or more of the streams to Node B 14 at a MAC layer, based on the associated E-TFC and the corresponding set of states (e.g., and/or the streams to be utilized).

In another example, E-TFCs selectable by E-TFC selecting component 20 can have associated minimum T2P/TBS for additional streams, such that the communicating component 22 cannot transmit over the additional streams using associated T2P or TBS that are below the minimum (and thus communications over these streams can be cancelled). Also, the minimum E-TFC set (e.g., a set of E-TFCs that can transmit when UE 12 power is below a threshold) can be maintained for the primary stream or one stream.

Moreover, where n HARQ processes can be used by UE 12 for retransmitting communications over streams indicated in the scheduling grants, the HARQ index for the primary stream can be 0 to n−1, and for the secondary stream can be n to 2n−1 (and for tertiary stream can be 2n to 3n−1, etc.). Where communicating component 22 transmits uplink communications over two streams, for example, the HARQ indices can be paired, such that for index k, where 0<=k<n, of the primary stream, the secondary stream can have HARQ index k+n. Communicating component 22 can use the appropriate HARQ index for retransmitting communications from the first and/or second streams, depending on the state in the set of states of the selected E-TFC corresponding to the configuration of streams, etc.

Additionally, communicating component 22 can keep an original TBS of the stream for retransmitting data over the stream based on the configuration of streams. For example, for retransmission over a primary stream where two streams are assigned and utilized according to the configuration of streams, communicating component 22 can utilize the TBS for the retransmission that is similar to that used over the primary stream to initially transmit. Communicating component 22 can further transmit the secondary stream where allowed according to the grant, power, and data, as described previously, when considering the retransmission of the primary stream. In another example, for retransmission over a secondary stream where two streams are assigned and utilized according to the configuration of streams, communicating component 22 can utilize the TBS for the retransmission that is similar to that used over the secondary stream to initially transmit. In this example, the communicating component 22 can also communicate a new transmission over the primary stream so as to not violate possible constraints regarding the relationship between the secondary stream throughput and primary stream throughput, as described. Throughput is also referred to herein as T2P/TBS, as the T2P/TBS of a stream may result in the throughput thereof. In another example, the retransmission of data from the secondary stream can occur on the primary stream as a single stream transmission to the Node B 14.

Also, for example, UE 12 can update scheduling grants partly based on HARQ retransmissions. The scheduling grant updates can be independent per HARQ index. In an example, if the scheduling grant update for the secondary stream is lower than the minimum TBS, as described, a zero grant size can be used for the secondary stream. In another example, if the primary stream has no data for transmission, the scheduling grant update on the primary stream can be zero, and the secondary stream grant update can be greater than zero despite constraints on the relationship between the allowed primary and secondary throughput described above.

Communicating component 22 can also implement power scaling for multiple-stream transmissions (e.g., where the selected state in the set of states for the E-TFC allows transmission over more than just the primary stream). Though described below in the context of two streams, more streams are possible for computing power scaling for the streams. It is to be appreciated that the communicating component 22 can give priority to a stream that is retransmitting. In one example, communicating component 22 can compute the power for two streams based on the primary stream (e.g., based on the T2P/TBS of a retransmission or a related scheduling grant of the primary stream). Where retransmission occurs on the secondary stream, however, this may cause packet failure where the original T2P/TBS is large for the streams, and then the scheduling grant for the first stream results in a smaller T2P/TBS. In this example, the retransmission for the secondary stream may require the original T2P/TBS, but may be assigned the smaller T2P/TBS of the scheduling grant on the primary stream.

In another example, communicating component 22 can compute the power scaling for the streams based on the larger power computed for one of the streams. In this example, the computed power scaling for the primary stream can be based on the T2P/TBS for retransmission or for a received scheduling grant. The computed power scaling for the secondary stream can be based on the T2P/TBS of a scheduling grant for a new transmission, or for retransmission can be based on the previous power or the previous scheduling grant when the packet started. For example, if the packet is for retransmission on the secondary stream, the computed power for the secondary stream corresponds to the power on the primary stream when the packet to retransmit is originally formed. As an alternative, if the packet is for retransmission on the secondary stream, the computed power for the secondary stream corresponds to the power that would be used by the primary stream if SG on the serving stream is fully utilized. As another alternative, if the packet is for retransmission on the secondary stream, the computed power for the secondary stream corresponds to the power used in the previous transmission attempt. The communicating component 22 can choose the maximum of the computed power scaling for the primary stream and the computed power scaling for the secondary stream as the power scaling for both streams.

If there is a new packet on the secondary stream, in one example, the communicating component 22 can select a T2P/TBS for the secondary stream based on scheduling grant and the E-TFC restriction, described above. If the minimum T2P/TBS is below a threshold value, communicating component 22 may not utilize the secondary stream for communicating. Thus, the communicating component 22 chooses the T2P/TBS of the primary stream based on the set of states in the selected E-TFC corresponding to one stream only, the scheduled grant, and/or the data (e.g., a T2P/TBS sufficient for transmitting the data over the grant with no other streams to consider). The communicating component 22 can also allow the secondary pilot transmission without the second data stream, where the power for the secondary pilot is at an offset to the power for the primary pilot. The T2P for the minimum TBS should be chosen so that dynamic switching between an on/off state of the secondary stream where the T2P/TBS is above/below a threshold does not cause a large oscillation in the power for the secondary pilot.

In another example, non-scheduled grant can be applied to both streams to allow at least a minimum transmission to Node B 14. For example, the communicating component 22 can apply the non-scheduled grant starting with the primary stream, and data can be filled according to the T2P/TBS of the non-scheduled grant on the primary stream and then to additional streams. Moreover, given the multiple streams, the UE 12 can have up to a similar number of E-RGCHs on both Node B 14 and one or more non-serving Node Bs.

Communicating component 22 can also communicate feedback regarding the scheduling grants to Node B 14. For example, the communicating component 22 can transmit a happy bit in enhanced dedicated physical control channel (E-DPCCH) and/or secondary E-DPCCH (S-E-DPCCH), which in an aspect can be the same happy bit value in both cases. As used herein, in this aspect, "happy bit" refers to an indicator transmitted from UE 12 to Node B 14 indicating whether the uplink data rate allocated to the UE is sufficient, given the amount of data in the UE's buffer. For example, communicating component 22 can compute the happy bit based on the combined data rate and/or power on all streams. As such, this case may be referred to as using a single happy transmitted in the E-DPCCH to provide the noted indication to Node B 14. In another aspect where such a single happy bit provides the noted indication, a happy bit normally associated with the S-E-DPCCH may thus be considered an "extra happy bit," and according to the present aspects may be defined to have an alternative use, such as to provide an indication related to the secondary stream. For example, in this case, the "extra happy bit": may be set to equal to a pre-agreed one of the other bits in the S-E-DPCCH, or to a 1-bit checksum based on some or all of the other bits, which can assist Node B 14 in decoding of S-E-DPCCH; may be set to 1 to indicate that UE 12 executed autonomous fall-back to rank 1 even though it received signaling from Node B 14 requesting rank 2 transmission, in particular, the setting of the bit to 1 could also convey whether the fall-back was due to power limitation or buffer limitation; and, may be set to equal one of the bits (either LSB or MSB) of the precoder index used at a predefined earlier slot, which could help Node B 14 to control the power of the downlink channel on which the precoder index is signaled. In any case, control channel decoding component 26 can obtain and decode one of the happy bits and utilize the happy bit to determine whether to modify the scheduling grants of the streams. Communicating component 22 can also transmit scheduling information (SI) reports for both streams to Node B 14. The SI report can include power headroom information considering the power of the S-DPCCH and S-E-DPCCH, for example. Additionally, the control channel decoding component 26 can implement NULL detection (e.g., determining whether a channel is in use) for various control channels (e.g., E-AGCH, E-RGCH, E-DPCCH, etc.) since the communicating component 22 may not utilize secondary or other additional streams in the grants for a given transmission, as described. Also, in one example, control channel decoding component 26 can decode control data from UE 12 based in part on the schedule grants, the minimum T2P/TBS, and perhaps a single happy bit representing the one or more streams.

In another example, RNC 16 can implement an outer loop power control loop to adjust power of UE 12 based on data received therefrom. In one example, power controlling component 32 can control power of UE 12 based on data received only over the primary stream. In this example, packet identifier indicating component 28 can include a stream identifier for packets from UE 12 provided to RNC 16. In this example, packet identifier receiving component 30 can determine a stream identifier for packets obtained from Node B 14 related to UE 12. Power controlling component 32 can consider packets having a stream identifier related to the primary stream for controlling power of UE 12. In another example, power controlling component 32 can control power of UE 12 based on packets from all streams, and thus signaling the stream identifier is not required in this example. Moreover, in one example, power controlling component 32 can use two or more power loops, one for each stream. In this example, since one or more streams may not be utilized, packet identifier indicating component 28 can similarly include a stream identifier in packets communicated to the RNC 16. Thus, the RNC 16 can determine whether packets are received for a given stream (and thus whether the power loop for the stream should be initialized).

In any case, power controlling component 32 can transmit power control commands to UE 12 (e.g., via Node B 14). For example, the power control commands can indicate whether to increase or decrease a transmit power. Communicating component 22 can adjust the power substantially equally for the streams based on the power control commands. For example, if after applying power adjustments and gain factors to E-DPCCH and S-E-DPCCH, the power would exceed a maximum allowed power, communicating component 22 can reduce the enhanced dedicated physical data channel (E-DPDCH) and secondary E-DPDCH (S-E-DPDCH) gain factors by an equal scaling factor so the total transmit power is equal to the maximum allowed power. In one example, the scaling factor can be computed based on the primary stream (e.g., based on a scaling factor to achieve the power over the primary stream). In addition, if communicating component 22 determines $E\text{-}TFCI_i$ is greater than $E\text{-}TFCI_{ec,boost}$, which is the E-TFC identifier (E-TFCI) threshold beyond which E-DPCCH power is boosted to provide additional reference signal, can reduce only the E-DPDCH gain factors according to the scaling factors, and transmit E-DPCCH using the original power. Similarly, if S-E-DPDCH is used for the extra reference channel for the secondary stream, $E\text{-}TFCI_{ec,boost}$ for the second stream can be used, and if S-E-DPCCH is boosted, communicating component 22 can reduce the gain of the S-E-DPDCH according to the scaling factors.

Communicating component 22 can apply additional scaling to total transmit power to reach a maximum allowed power if: (1) a DPDCH is configured and the total transmit power would still exceed the maximum allowed value even though discontinuous transmit (DTX) is used on all E-DPDCHs; or (2) no DPDCH is configured and the total transmit power would still exceed the maximum allowed value even though a gain factor for all k is at a minimum gain factor. Furthermore, communicating component 22 can further scale the total transmit power according to a defined power ratio between DPCCH and DPDCH.

Figure 2:
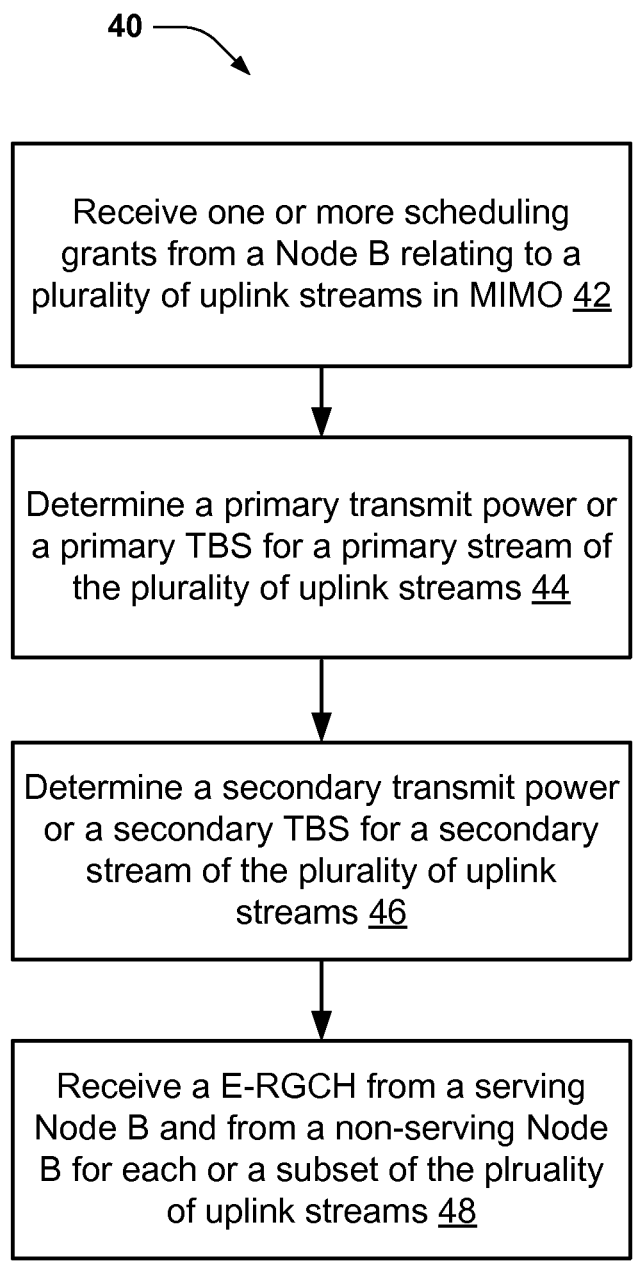
FIG. 2 is a flowchart of one aspect of a method of the system of FIG. 1.

Referring to FIG. 2, in one aspect, a method 40 for communicating over multiple streams in uplink MIMO is illustrated. For explanatory purposes, method 40 will be discussed with reference to the above described FIG. 1. It should be understood that in other implementations other systems and/or UEs, NodeBs, or RNCs comprising different components than those illustrated in FIG. 1 may be used in implementing method 40 of FIG. 2.

At 42, scheduling grant receiving component 18 may receive one or more scheduling grants relating to a plurality of uplink streams in MIMO from a Node B scheduling component 24. For example, scheduling grant receiving component 18 may receive the scheduling grants over a control channel for assigning resources from the Node B. The scheduling grants can be per stream, such that a scheduling grant is received for each of the uplink streams.

At 44, a communicating component 22 may compute a primary transmit power or a primary TBS for a primary stream of the plurality of uplink streams, and at 46, the communicating component 22 may determine a secondary transmit power or a secondary TBS for a secondary stream of the plurality of uplink streams. As described, the communicating component 22 may determine the primary transmit power and the secondary transmit power based on a selected E-TFC for the uplink streams and/or a related set of states corresponding to whether communications can occur over the uplink streams. For example, where power or resources are available, the communication component 22 may compute transmit power and TBS as values sufficient for transmitting over the primary and secondary streams. In some cases, however, the states of an E-TFC may not allow for transmission over the primary and secondary streams (e.g., or at least may not allow a sufficient secondary TBS for communicating over the secondary stream) depending on available resources. Moreover, selecting component 20 may select an E-TFC that is used to determine HARQ resources for retransmitting data for primary or secondary streams, receive scheduling grant updates based on HARQ retransmissions, determine power scaling for transmissions over the plurality of streams, application of non-scheduled grants over the plurality of streams, and/or the like, as described in further detail above. In addition, the e-TFC selecting component 20 can configure grant channels per uplink stream, a common happy bit for the plurality of uplink streams can be communicated to the Node B, and/or the like, as described.

At 48, in some aspects, communication component 22 may receive one or more enhanced relative grant channels (E-RGCH) from one or more Node B. For example, scheduling component 24 of a serving Node B may provide a first E-RGCH, and a scheduling component of one or more non-serving Node Bs may provide additional E-RGCHs. As described herein, permitting a non-serving Node B to communicate an E-RGCH to a UE can cause a decrease in transmit power to protect the non-serving Node B from interference by the UE.

Figure 3:
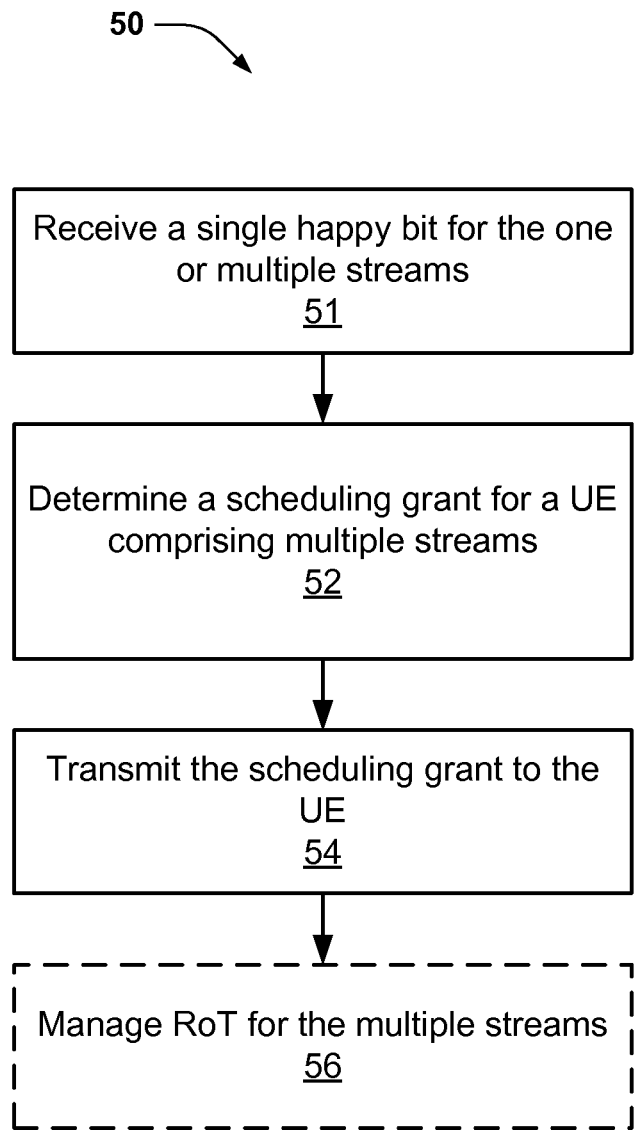
FIG. 3 is a flowchart of one aspect of a method of the system of FIG. 1.

Referring to FIG. 3, in one aspect, illustrated is a method 50 for assigning multiple uplink streams to a UE in a wireless network. For explanatory purposes, method 50 will be discussed with reference to the above described FIG. 1. It should be understood that in other implementations other systems and/or UEs, NodeBs, or RNCs comprising different components than those illustrated in FIG. 1 may be used in implementing method 50 of FIG. 3.

At 51, in an aspect, Node B 14 may receive a single happy bit for the one or multiple streams.

At 52, scheduling component 24, shown in FIG. 1, may determine a scheduling grant for a UE comprising multiple streams, which in one aspect may be based in part on whether the scheduling grant increases throughput at the UE or Node B (e.g., Node B 14) or a related cell. For example, both considerations can be taken into account in determining whether to grant multiple uplink streams to the UE, as described.

At 54, the scheduling component 24 may transmit the scheduling grant to the UE. For example, this can occur over one or more grant channels.

Optionally, at 56, scheduling component 24 may manage RoT for the multiple streams. As described, for example, the scheduling component 24 may manage the RoT for a stream based in part on detecting UE behavior over the stream. For example, where the UE requests smaller T2P/TBS though it has sufficient power to utilize more T2P/TBS, the scheduling component 24 can infer that the UE is causing interference to a non-serving Node B. Thus, at 56, the scheduling component 24 may manage the RoT by communicating a smaller scheduling grant to the UE while repurposing the resulting RoT margin to other UEs.

Figure 4:
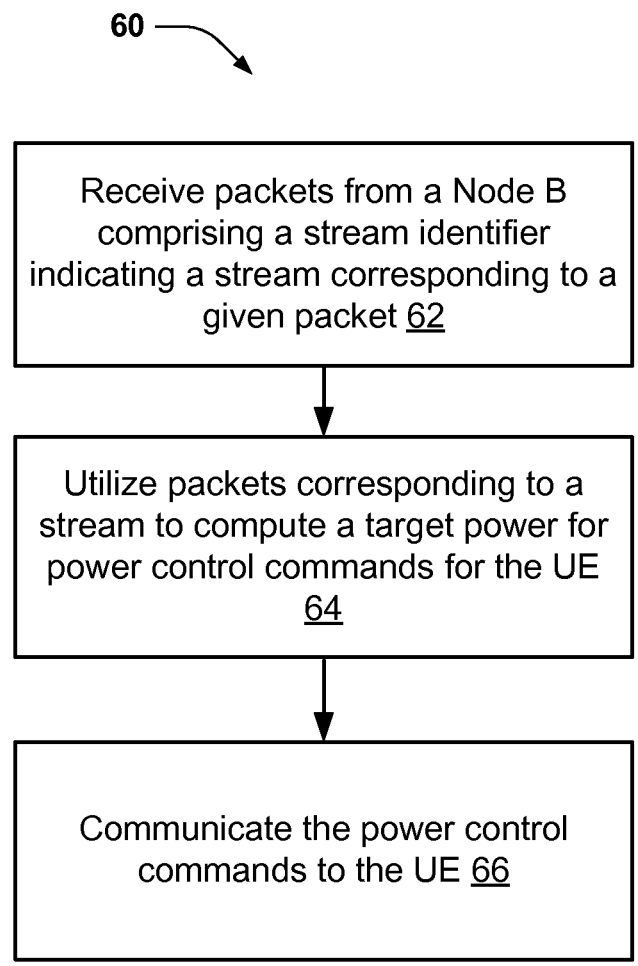
FIG. 4 is a flowchart of one aspect of a method of the system of FIG. 1.

FIG. 4, in one aspect, illustrates a method 60 for adjusting power of a UE communicating over multiple streams.

At 62, packet identifier receiving component 30 may receive packets comprising a stream identifier indicating a stream corresponding to a given packet from a Node B. For example, the stream identifier can correspond to a stream of a given UE, where the UE communicates the packets to the Node B, and the Node B forwards the packets for providing to a core network.

At 64, power controlling component 32 may use packets corresponding to a stream to compute a target power for power control commands for the UE. For example, this can include computing power set point, which is the target signal-to-noise-and-interference ratio for the UE. Thus, the power controlling component 32 may use the packets for a single stream of the UE to compute the set point. It is to be appreciated that packets of other identifiers can be ignored for power control purposes or utilized to compute power control for the specific stream, in one example.

At 66, the power controlling component 32 can communicate the power control commands to the UE. For example, this communication can occur through the Node B over a channel dedicated to power control commands.

Figure 5:
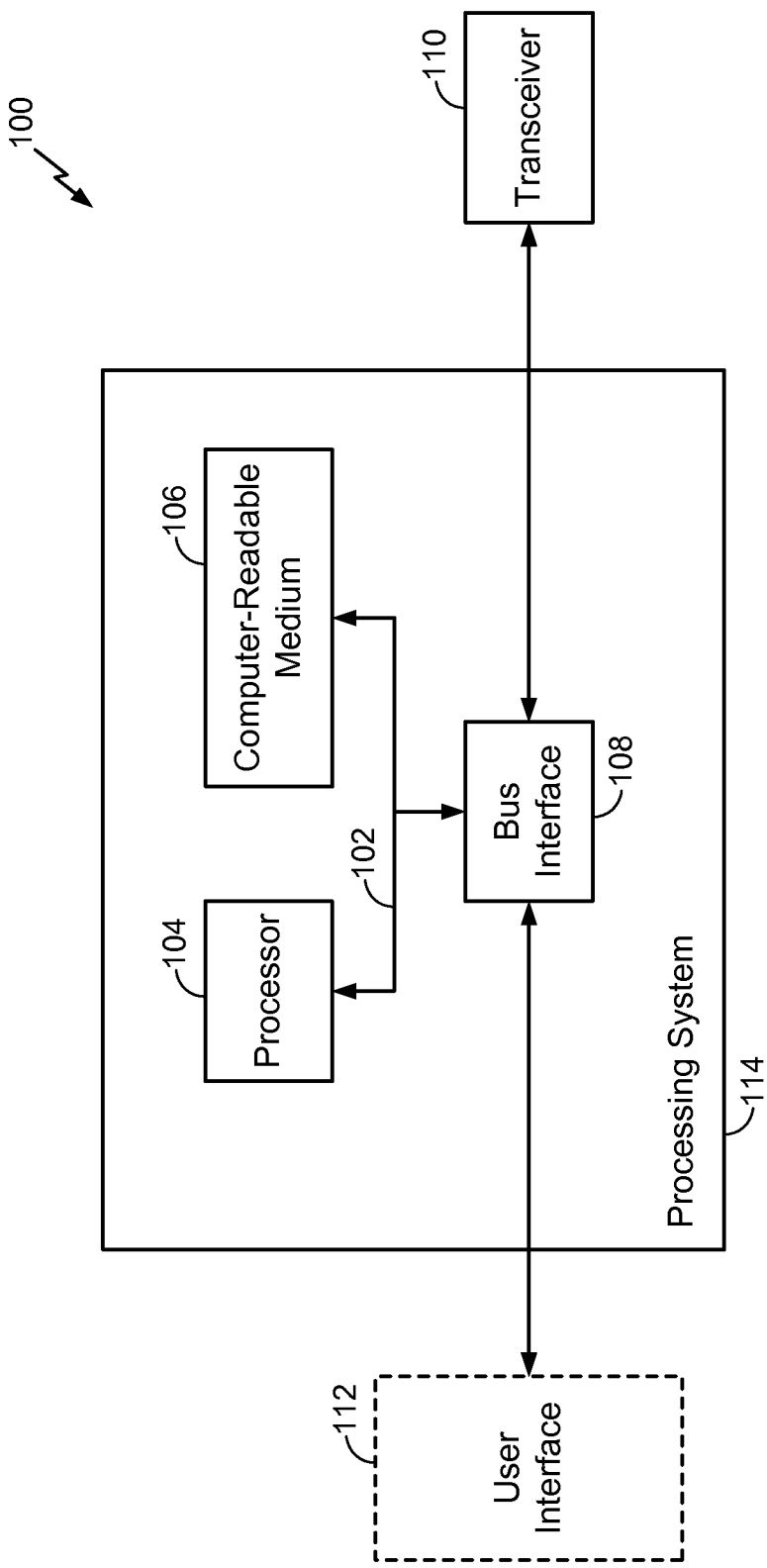
FIG. 5 is a block diagram illustrating an example of a hardware implementation for an apparatus of FIG. 1 employing a processing system.

FIG. 5 is a top level block diagram illustrating an example of a hardware implementation for an apparatus 100 employing a processing system 114. For example, apparatus 100 may be specially programmed or otherwise configured to operate as UE 12, Node B 14, RNC 16, etc., as described above. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software. In an aspect, for example, processor 104 and/or computer-readable medium 106 may be specially programmed or otherwise configured to operate as UE 12, Node B 14, RNC 16, etc., as described above.

As noted above, apparatus 100 may be specifically programmed or otherwise configured to operate as UE 12, Node B 14, RNC 16, etc. For example, processor 104, in conjunction with bus interface 108 and computer-readable medium 106 may be used to implement components 18 and 20 of UE 16. Processor 104, bus interface 108, computer-readable medium 106, and transceiver 110 may be configured to implement component 22 of UE 16. When apparatus 100 is operating as Node B 14, processor 104 in conjunction with bus interface 108 and computer-readable medium 106 may be configured to implement components 24, 26, and 28 of Node B 16. Likewise, when apparatus 100 is operating as RNC 16, processor 104 in conjunction with bus interface 108 and computer-readable medium 106 may be configured to implement components 30 and 32 of RNC 16.

The various concepts presented throughout this disclosure may be implemented across a broad variety of telecommunication systems, network architectures, and communication standards.

Figure 6:
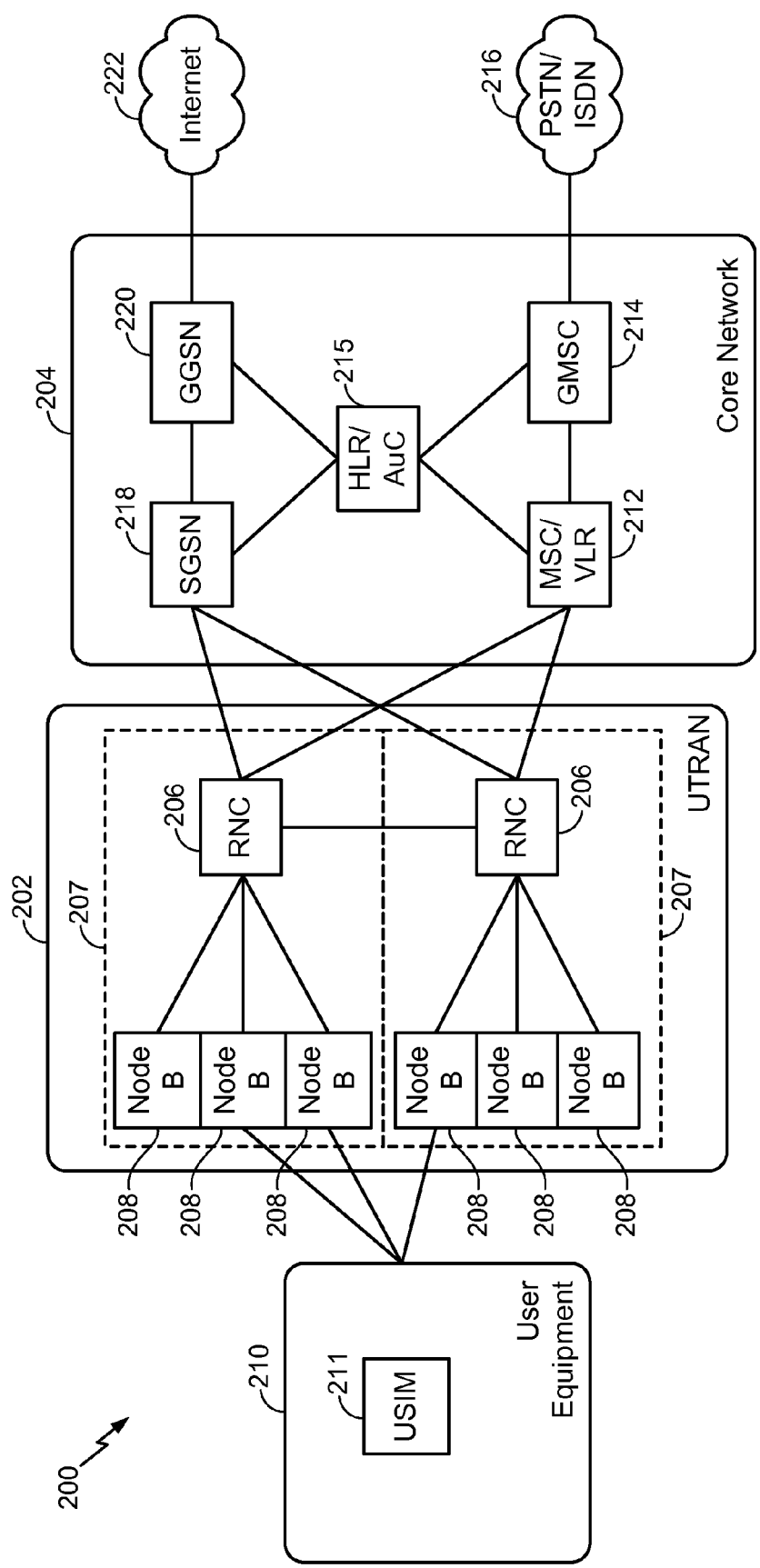
FIG. 6 is a block diagram conceptually illustrating an example of a telecommunications system including aspects of the system of FIG. 1.

By way of example and without limitation, the aspects of the present disclosure illustrated in FIG. 6 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference. Further, for example, UE 210 may be specially programmed or otherwise configured to operate as UE 12, and/or Node B 208 as Node B 14, as described above.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of UEs 210, which may be mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
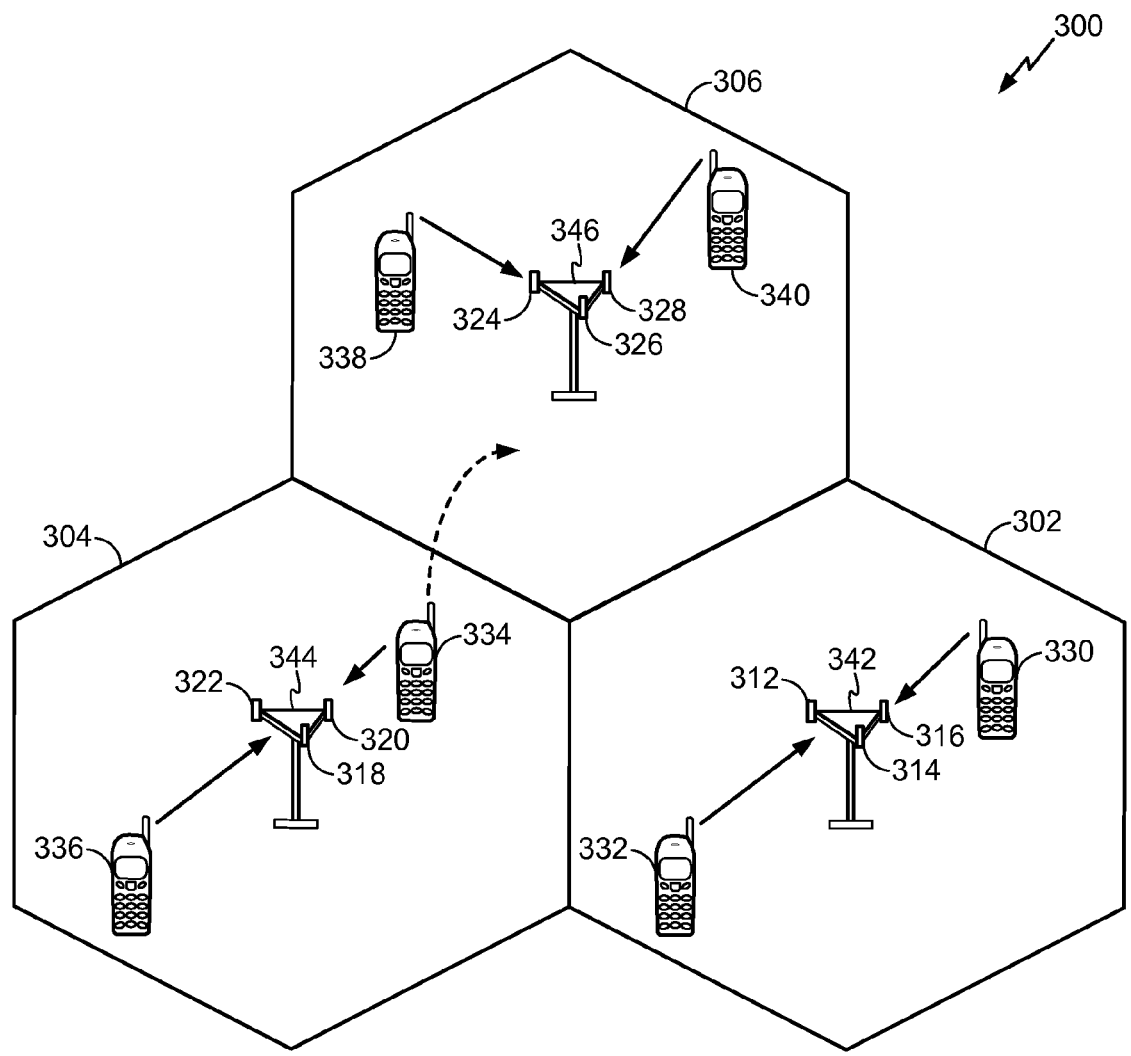
FIG. 7 is a conceptual diagram illustrating an example of an access network including aspects of the system of FIG. 1.

Referring to FIG. 7, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 6) for all the UEs 330, 332, 334, 336, 338, 340 in the respective cells 302, 304, and 306. For example, in an aspect, the UEs of FIG. 7 may be specially programmed or otherwise configured to operate as UE 12, and/or Node Bs as Node B 14, as described above.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 6), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 8:
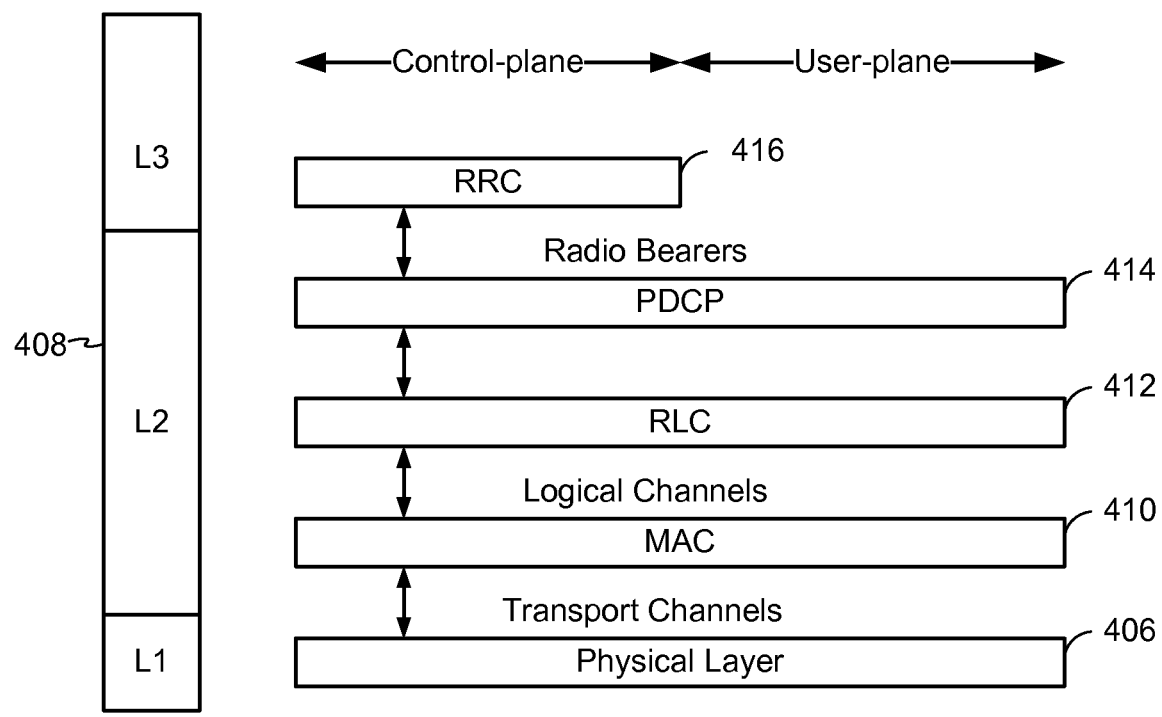
FIG. 8 is a conceptual diagram illustrating an example of a radio protocol architecture for the user and control plane implemented by components of the system of FIG. 1.

The radio protocol architecture may take on various forms depending on the particular application. An example for an HSPA system will now be presented with reference to FIG. 8. FIG. 8 is a conceptual diagram illustrating an example of the radio protocol architecture for the user and control planes.

Referring to FIG. 8, the radio protocol architecture for the UE and Node B is shown with three layers: Layer 1, Layer 2, and Layer 3. Layer 1 is the lowest lower and implements various physical layer signal processing functions. Layer 1 will be referred to herein as the physical layer 406. Layer 2 (L2 layer) 408 is above the physical layer 406 and is responsible for the link between the UE and Node B over the physical layer 406. For example, the UE corresponding to the radio protocol architecture of FIG. 8 may be specially programmed or otherwise configured to operate as UE 12, Node B 14, etc., as described above.

In the user plane, the L2 layer 408 includes a media access control (MAC) sublayer 410, a radio link control (RLC) sublayer 412, and a packet data convergence protocol (PDCP) 414 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between node Bs. The RLC sublayer 412 provides segmentation and reassembly of upper layer data packets, retransmission of lost data packets, and reordering of data packets to compensate for out-of-order reception due to hybrid automatic repeat request (HARQ). The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Figure 9:
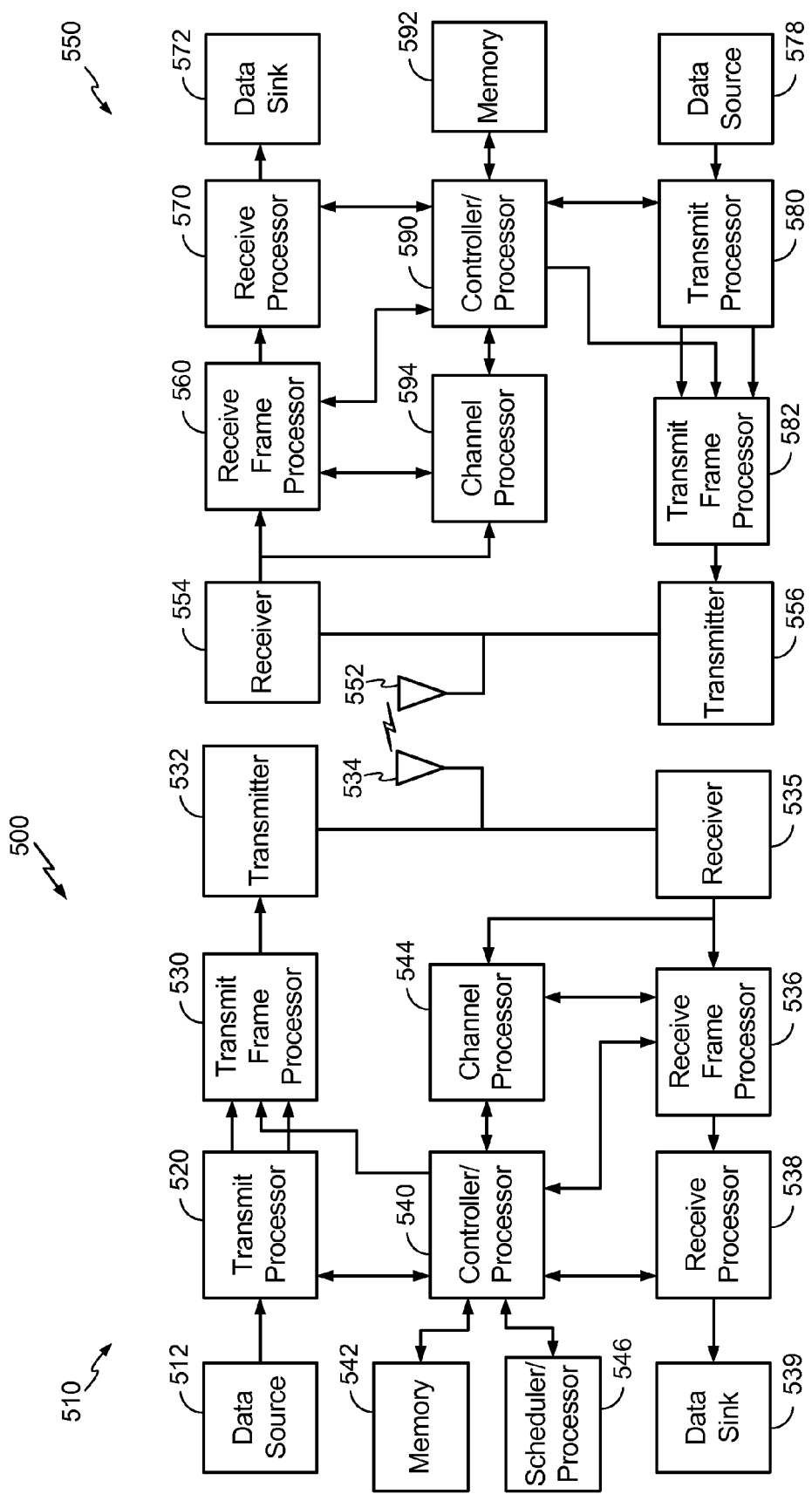
FIG. 9 is a block diagram conceptually illustrating an example of a Node B in communication with a UE in a telecommunications system, including aspects of the system of FIG. 1.

FIG. 9 is a block diagram of a system 500 including a Node B 510 in communication with a UE 550. For example, UE 550 may be specially programmed or otherwise configured to operate as UE 12 (FIG. 1), and/or Node B 510 as Node B 14 (FIG. 1), as described above. Further, for example, the Node B 510 may be the Node B 208 in FIG. 6, and the UE 550 may be the UE 210 in FIG. 6. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. In some aspects, the controller/processors 540 and 590 may be implemented by processing system 114, shown in FIG. 5, as processors 104. As described above, processors 104 may be configured to implement, in conjunction with other components, the functions of components 18, 20, and 22 of UE 12 and/or the functions of components 24, 26, and 28 of Node B 14. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors as shown, for example, in FIG. 5. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more."

Further, unless specifically stated otherwise, the term "some" refers to one or more. A phrase referring to "at least one of" a list of items refers to any combination of those items, including single members. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for communicating using multiple-input multiple-output (MIMO) in a wireless network, comprising:
   receiving, at a user equipment (UE), one or more scheduling grants from a Node B relating to a plurality of uplink streams of the UE in MIMO on a single carrier;
   receiving an enhanced relative grant channel (E-RGCH) from the Node B, as well as another E-RGCH from a non-serving Node B, for each or a subset of the plurality of uplink streams;
   determining a primary transmit power and a primary transport block size (TBS) for a primary stream of the plurality of uplink streams, the primary stream carrying a primary data channel (E-DPDCH) on the single carrier;
   determining a secondary transmit power and a secondary TBS for a secondary stream of the plurality of uplink streams, the secondary stream carrying a secondary data channel (S-E-DPDCH) on the single carrier; and
   transmitting scheduling information including a defined headroom for the plurality of streams based on consideration of a power of a secondary dedicated physical control channel (S-DPCCH) and a power of a secondary enhanced dedicated physical control channel (S-E-DPCCH) on the single carrier.

2. The method of claim 1, wherein the E-RGCH is a serving E-RGCH and the another E-RGCH is a non-serving E-RGCH.

3. The method of claim 1, further comprising communicating a first happy bit based on a combined data rate over the plurality of uplink streams, the primary transmit power, and the secondary transmit power.

4. The method of claim 3, wherein the communicating the first happy bit comprises communicating the first happy bit over an enhanced dedicated physical control channel (E-DPCCH) or the S-E-DPCCH.

5. The method of claim 3, wherein the communicating the first happy bit comprises communicating the first happy bit over an enhanced dedicated physical control channel (E-DPCCH), and further comprising communicating a second happy bit over the S-E-DPCCH, wherein the second happy bit provides an indication related to the secondary stream.

6. An apparatus for communicating using multiple-input multiple-output (MIMO) in a wireless network, comprising:
means for receiving one or more scheduling grants from a Node B relating to a plurality of uplink streams in MIMO on a single carrier;
means for receiving an enhanced relative grant channel (E-RGCH) from the Node B, as well as another E-RGCH from a non-serving Node B, for each or a subset of the plurality of uplink streams;
means for determining a primary transmit power and a primary transport block size (TBS) for a primary stream of the plurality of uplink streams, the primary stream carrying a primary data channel (E-DPDCH) on the single carrier;
means for determining a secondary transmit power and a secondary TBS for a secondary stream of the plurality of uplink streams, the secondary stream carrying a secondary data channel (S-E-DPDCH) on the single carrier; and
means for transmitting scheduling information including a defined headroom for the plurality of streams based on consideration of a power of a secondary dedicated physical control channel (S- DPCCH) and a power of a secondary enhanced dedicated physical control channel (S-E-DPCCH) on the single carrier.

7. The apparatus of claim 6, wherein the E-RGCH is a serving E-RGCH and the another E-RGCH is a non-serving E-RGCH.

8. The apparatus of claim 6, further comprising means for communicating a first happy bit based on a combined data rate over the plurality of uplink streams, the primary transmit power, and the secondary transmit power.

9. The apparatus of claim 8, wherein the means for communicating the first happy bit comprises means for communicating the first happy bit over an enhanced dedicated physical control channel (E-DPCCH) or the S-E-DPCCH.

10. The apparatus of claim 8, wherein the means for communicating the first happy bit is configured to communicate the first happy bit over an enhanced dedicated physical control channel (E-DPCCH), and to communicate a second happy bit over the S-E-DPCCH, wherein the second happy bit provides an indication related to the secondary stream.

11. A non-transitory computer-readable medium for communicating using multiple-input multiple-output (MIMO) in a wireless network comprising code for causing a computer to:
receive one or more scheduling grants from a Node B relating to a plurality of uplink streams in MIMO on a single carrier;
receive an enhanced relative grant channel (E-RGCH) from the Node B, as well as another E-RGCH from a non-serving Node B, for each or a subset of the plurality of uplink streams;
determine a primary transmit power and a primary transport block size (TBS) for a primary stream of the plurality of uplink streams, the primary stream carrying a primary data channel (E-DPDCH) on the single carrier;
determine a secondary transmit power and a secondary TBS for a secondary stream of the plurality of uplink streams, the secondary stream carrying a secondary data channel (S-E-DPDCH) on the single carrier; and
transmit scheduling information including a defined headroom for the plurality of streams based on consideration of a power of a secondary dedicated physical control channel (S-DPCCH) and a power of a secondary enhanced dedicated physical control channel (S-E-DPCCH) on the single carrier.

12. The non-transitory computer-readable medium of claim 11, wherein the E-RGCH is a serving E-RGCH and the another E-RGCH is a non-serving E-RGCH.

13. The non-transitory computer-readable medium of claim 11, wherein the code is further configured to cause the computer to communicate a first happy bit based on a combined data rate over the plurality of uplink streams, the primary transmit power, and the secondary transmit power.

14. The non-transitory computer-readable medium of claim 13, wherein the code is further configured to cause the computer to communicate the first happy bit over an enhanced dedicated physical control channel (E-DPCCH) or the S-E-DPCCH.

15. The non-transitory computer-readable medium of claim 13, wherein the code for communicating the first happy bit comprises code for communicating the first happy bit over an enhanced dedicated physical control channel (E-DPCCH), and code for communicating a second happy bit over the S-E-DPCCH, wherein the second happy bit provides an indication related to the secondary stream.

16. An apparatus for communicating using multiple-input multiple-output (MIMO) in a wireless network, comprising:
at least one processor configured to:
receive one or more scheduling grants from a Node B relating to a plurality of uplink streams in MIMO on a single carrier;
receive an enhanced relative grant channel (E-RGCH) from the Node B, as well as another E-RGCH from a non-serving Node B, for each or a subset of the plurality of uplink streams;
determine a primary transmit power and a primary transport block size (TBS) for a primary stream of the plurality of uplink streams, the primary stream carrying a primary data channel (E-DPDCH) on the single carrier;
determine a secondary transmit power and a secondary TBS for a secondary stream of the plurality of uplink streams, the secondary stream carrying a secondary data channel (S-E-DPDCH) on the single carrier; and
transmit scheduling information including a defined headroom for the plurality of streams based on consideration of a power of a secondary dedicated physical control channel (S-DPCCH) and a power of a secondary enhanced dedicated physical control channel (S-E-DPCCH) on the single carrier; and
a memory coupled to the at least one processor.

17. The apparatus of claim 16, wherein the E-RGCH is a serving E-RGCH and the another E-RGCH is a non-serving E-RGCH.

18. The apparatus of claim 16, wherein the at least one processor is further configured to communicate a first happy bit based on a combined data rate over the plurality of uplink streams, the primary transmit power, and the secondary transmit power.

19. The apparatus of claim 18, wherein the at least one processor is further configured to communicate the first happy bit over an enhanced dedicated physical control channel (E-DPCCH) or the S-E-DPCCH.

20. The apparatus of claim 18, wherein in communicating the first happy bit the at least one processor is further configured to communicate the first happy bit over an enhanced dedicated physical control channel (E-DPCCH), and is further configured to communicate a second happy bit over the S-E-DPCCH, wherein the second happy bit provides an indication related to the secondary stream.

21. A method for communicating using multiple-input multiple-output (MIMO) in a wireless network, comprising:
receiving, at a user equipment (UE), one or more scheduling grants from a Node B relating to a plurality of uplink streams of the UE in MIMO on a single carrier;
receiving an enhanced relative grant channel (E-RGCH) from the Node B, as well as another E-RGCH from a non-serving Node B, for each or a subset of the plurality of uplink streams;
determining a primary transmit power and a primary transport block size (TBS) for a primary stream of the plurality of uplink streams, the primary stream carrying a primary data channel (E-DPDCH) on the single carrier;
determining a secondary transmit power and a secondary TBS for a secondary stream of the plurality of uplink streams, the secondary stream carrying a secondary data channel (S-E-DPDCH) on the single carrier;
transmitting scheduling information including a defined headroom for the plurality of streams based on consideration of a power of a secondary dedicated physical control channel (S-DPCCH) and a power of a secondary enhanced dedicated physical control channel (S-E-DPCCH) on the single carrier; and
communicating a first happy bit based on a combined data rate over the plurality of uplink streams, the primary transmit power, and the secondary transmit power, wherein the communicating the first happy bit comprises communicating the first happy bit over an enhanced dedicated physical control channel (E-DPCCH), and further comprising communicating a second happy bit over the S-E-DPCCH, wherein the second happy bit provides an indication related to the secondary stream, wherein the second happy bit indicates a check-sum of one or more other bits in the S-E-DPCCH.

22. A method for communicating using multiple-input multiple-output (MIMO) in a wireless network, comprising:
receiving, at a user equipment (UE), one or more scheduling grants from a Node B relating to a plurality of uplink streams of the UE in MIMO on a single carrier;
receiving an enhanced relative grant channel (E-RGCH) from the Node B, as well as another E-RGCH from a non-serving Node B, for each or a subset of the plurality of uplink streams;
determining a primary transmit power and a primary transport block size (TBS) for a primary stream of the plurality of uplink streams, the primary stream carrying a primary data channel (E-DPDCH) on the single carrier;
determining a secondary transmit power and a secondary TBS for a secondary stream of the plurality of uplink streams, the secondary stream carrying a secondary data channel (S-E-DPDCH) on the single carrier;
transmitting scheduling information including a defined headroom for the plurality of streams based on consideration of a power of a secondary dedicated physical control channel (S-DPCCH) and a power of a secondary enhanced dedicated physical control channel (S-E-DPCCH) on the single carrier; and
communicating a first happy bit based on a combined data rate over the plurality of uplink streams, the primary transmit power, and the secondary transmit power, wherein the communicating the first happy bit comprises communicating the first happy bit over an enhanced dedicated physical control channel (E-DPCCH), and further comprising communicating a second happy bit over the S-E-DPCCH, wherein the second happy bit provides an indication related to the secondary stream, wherein the second happy bit indicates that an autonomous fallback to rank 1 transmission has occurred even though the Node B has requested rank 2 transmission.

23. A method for communicating using multiple-input multiple-output (MIMO) in a wireless network, comprising:
receiving, at a user equipment (UE), one or more scheduling grants from a Node B relating to a plurality of uplink streams of the UE in MIMO on a single carrier;
receiving an enhanced relative grant channel (E-RGCH) from the Node B, as well as another E-RGCH from a non-serving Node B, for each or a subset of the plurality of uplink streams;
determining a primary transmit power and a primary transport block size (TBS) for a primary stream of the plurality of uplink streams, the primary stream carrying a primary data channel (E-DPDCH) on the single carrier;
determining a secondary transmit power and a secondary TBS for a secondary stream of the plurality of uplink streams, the secondary stream carrying a secondary data channel (S-E-DPDCH) on the single carrier;
transmitting scheduling information including a defined headroom for the plurality of streams based on consideration of a power of a secondary dedicated physical control channel (S-DPCCH) and a power of a secondary enhanced dedicated physical control channel (S-E-DPCCH) on the single carrier; and
communicating a first happy bit based on a combined data rate over the plurality of uplink streams, the primary transmit power, and the secondary transmit power, wherein the communicating the first happy bit comprises communicating the first happy bit over an enhanced dedicated physical control channel (E-DPCCH), and further comprising communicating a second happy bit over the S-E-DPCCH, wherein the second happy bit provides an indication related to the secondary stream, wherein the second happy bit indicates a cause of autonomous fallback to rank 1 transmission.

* * * * *